(12) United States Patent
Hoshino (10) Patent No.: US 10,486,315 B2
(45) Date of Patent: Nov. 26, 2019

(54) MACHINE TOOL

(71) Applicant: FANUC CORPORATION, Yamanashi (JP)

(72) Inventor: Yoshinori Hoshino, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 41 days.

(21) Appl. No.: 15/726,561

(22) Filed: Oct. 6, 2017

(65) Prior Publication Data

US 2018/0099420 A1    Apr. 12, 2018

(30) Foreign Application Priority Data

Oct. 11, 2016 (JP) ................. 2016-200420

(51) Int. Cl.
*B25J 19/00* (2006.01)
*B23Q 11/00* (2006.01)
(Continued)

(52) U.S. Cl.
CPC .......... *B25J 19/0075* (2013.01); *B23Q 3/155* (2013.01); *B23Q 7/04* (2013.01); *B23Q 11/005* (2013.01); *B23Q 11/0064* (2013.01); *B23Q 11/0891* (2013.01); *B25J 19/0058* (2013.01); *B25J 21/00* (2013.01); *G05B 19/41825* (2013.01); *G05B 2219/49042* (2013.01); *Y02P 90/087* (2015.11);
(Continued)

(58) Field of Classification Search
CPC .... Y10T 409/30392; Y10T 409/304088; B25J 19/0058; B25J 19/190075
USPC .................................................. 409/134, 137
See application file for complete search history.

(56) References Cited

U.S. PATENT DOCUMENTS 3,204,492 A * 9/1965 Spreen ............... B23Q 11/0064
408/1 R
5,306,999 A    4/1994 Hoffman
(Continued)

FOREIGN PATENT DOCUMENTS

CN    203266941 U    11/2013
CN    204339410 U    5/2015
(Continued)

OTHER PUBLICATIONS

Application # JP 2016-153336—Shoichi, Morimura; "Machine Tool" (Year: 2016).*
(Continued)

*Primary Examiner* — Erica E Cadugan
*Assistant Examiner* — Michael Vitale
(74) *Attorney, Agent, or Firm* — Fredrikson & Byron, P.A.

(57) ABSTRACT

A machine tool includes: an exterior cover covering a machining area where a workpiece on a worktable is machined by a machining tool; an articulated robot arranged inside the exterior cover and configured to replace the workpiece on the worktable; a controller configured to control a posture of the articulated robot and a coordinate point at which a hand of the articulated robot is positioned; and an air nozzle arranged inside the exterior cover and configured to remove scattered matter that has been generated during machining of the workpiece and has adhered at least to the hand when the articulated robot is set at a predetermined posture or when the hand is moved to a predetermined coordinate point.

1 Claim, 11 Drawing Sheets

(51) Int. Cl.
  *B23Q 11/08* (2006.01)
  *B23Q 7/04* (2006.01)
  *B23Q 3/155* (2006.01)
  *B25J 21/00* (2006.01)
  *G05B 19/418* (2006.01)

(52) U.S. Cl.
  CPC .................. *Y10T 409/30392* (2015.01); *Y10T 409/30532* (2015.01); *Y10T 409/304088* (2015.01)

(56) References Cited

U.S. PATENT DOCUMENTS

| | | | |
|---|---|---|---|
| 6,210,086 B1 * | 4/2001 | Lecornet | B23Q 11/0042 408/67 |
| 2016/0214805 A1 * | 7/2016 | Ebihara | B65G 47/905 |
| 2018/0126567 A1 * | 5/2018 | Morimura | B08B 3/02 |

FOREIGN PATENT DOCUMENTS

| | | | | | |
|---|---|---|---|---|---|
| JP | 6274944 | U | | 5/1987 | |
| JP | 63105858 | A | | 5/1988 | |
| JP | 171045 | U | | 5/1989 | |
| JP | 5301142 | A | | 11/1993 | |
| JP | 636742 | U | | 5/1994 | |
| JP | 7601 | U | | 1/1995 | |
| JP | 7136892 | A | | 5/1995 | |
| JP | 866865 | A | | 3/1996 | |
| JP | 8174371 | A | | 7/1996 | |
| JP | 10277871 | A | | 10/1998 | |
| JP | 200162669 | A | | 3/2001 | |
| JP | 200368697 | A | | 3/2003 | |
| JP | 200389031 | A | | 3/2003 | |
| JP | 200498247 | A | | 4/2004 | |
| JP | 2006975 | A | | 1/2006 | |
| JP | 2008246585 | A | | 10/2008 | |
| JP | 2009212335 | A | | 9/2009 | |
| JP | 2009212335 | A | * | 9/2009 | |
| JP | 2013121466 | A | * | 6/2013 | ......... B23Q 11/0064 |
| JP | 201674062 | A | | 5/2016 | |
| JP | 2016135522 | A | | 7/2016 | |
| JP | 2016215346 | A | | 12/2016 | |
| JP | 201820402 | A | | 2/2018 | |
| SU | 1496987 | A1 | * | 7/1989 | ......... B23Q 11/0064 |
| WO | 2013099091 | A1 | | 7/2013 | |

OTHER PUBLICATIONS

English Abstract for Japanese Publication No. 05-301142 A, published Nov. 16, 1993, 8 pgs.
English Abstract and Machine Translation for Japanese Publication No. 2016-135522 A, published Jul. 28, 2016, 13 pgs.
English Abstract and Machine Translation for Japanese Publication No. 2008-246585 A, published Oct. 16, 2008, 15 pgs.
English Abstract and Machine Translation for Japanese Publication No. JPH0636742 U, published May 17, 1994, 8 pgs.
English Abstract and Machine Translation for Japanese Publication No. 2016-074062 A, published May 12, 2016, 11 pgs.
English Abstract and Machine Translation for Japanese Publication No. 07-136892 A, published May 30, 1995, 8 pgs.
English Abstract and Machine Translation for Japanese Publication No. 2004-098247 A, published Apr. 2, 2004, 7 pgs.
English Abstract and Machine Translation for International Publication No. WO2013099091 A1, published Jul. 4, 2013, 19 pgs.
English Abstract and Machine Translation for Japanese Publication No. 10-277871 A, published Oct. 20, 1998, 12 pgs.
English Machine Translation for Japanese Publication No. JPH07601 U, published Jan. 6, 1995, 8 pgs.
English Abstract and Machine Translation for Japanese Publication No. 08-174371 A, published Jul. 9, 1996, 8 pgs.
English Abstract and Machine Translation for Japanese Publication No. 2016-215346 A, published Dec. 22, 2016, 12 pgs.
English Abstract and Machine Translation for Japanese Publication No. 63-105858 A, published May 11, 1988, 7 pgs.
English Abstract and Machine Translation for Japanese Publication No. 2006-000975 A, published Jan. 5, 2006, 9 pgs.
English Machine Translation for Japanese Publication No. 62-074944 U, published May 13, 1987, 3 pgs.
English Abstract and Machine Translation for Japanese Publication No. 2018-020402 A, published Feb. 8, 2018, 11 pgs.
English Abstract and Machine Translation for Japanese Publication No. 08-066865 A, published Mar. 12, 1996, 25 pgs.
English Abstract and Machine Translation for Japanese Publication No. 2009-212335 A, published Sep. 17, 2009, 11 pgs.
English Abstract and Machine Translation for Japanese Publication No. 2003-068697 A, published Mar. 7, 2003, 12 pgs.
English Abstract and Machine Translation for Japanese Publication No. 2001-062669 A, published Mar. 13, 2001, 10 pgs.
English Abstract and Machine Translation for Japanese Publication No. 2003-089031 A, published Mar. 25, 2003, 13 pgs.
English Machine Translation for Japanese Publication No. 01-071045 U, published May 11, 1989, 3 pgs.
English Machine Translation of Decision to Grant issued by Japan Patent Office (JPO) in Japanese Application No. 2016-200420, dated Oct. 23, 2018, 3 pages.
Untranslated Decision to Grant issued by Japan Patent Office (JPO) in Japanese Application No. 2016-200420, dated Oct. 23, 2018, 3 pages.
English Machine Translation of Notification of Reasons for Refusal issued by Japan Patent Office (JPO) in Japanese Application No. 2016-200420, dated Aug. 21, 2018, 4 pages.
Untranslated Notification of Reasons for Refusal issued by Japan Patent Office (JPO) in Japanese Application No. 2016-200420, dated Aug. 21, 2018, 5 pages.
English Abstract and Machine Translation for Chinese Publication No. 203266941 U, published Nov. 6, 2013, 5 pgs.
English Abstract and Machine Translation for Chinese Publication No. 204339410 U, published May 20, 2015, 9 pgs.

* cited by examiner

MACHINE TOOL

CROSS-REFERENCE TO RELATED APPLICATION

This application is based upon and claims the benefit of priority from Japanese Patent Application No. 2016-200420 filed on Oct. 11, 2016, the contents of which are incorporated herein by reference.

BACKGROUND OF THE INVENTION

Field of the Invention

The present invention relates to a machine tool for machining a workpiece.

Description of the Related Art

Japanese Laid-Open Patent Publication No. 05-301142 discloses a machine tool having a transfer device for moving a workpiece from a workpiece magazine to a mounting jig.

SUMMARY OF THE INVENTION

According to the technique of Japanese Laid-Open Patent Publication No. 05-301142, since the machine tool includes an automatic transfer machine (transfer device), scatters such as chips, cutting fluid, etc., resulting from workpiece machining may adhere to the automatic transfer machine. When the hand (gripper) of the automatic transfer machine with scatters attached thereto tries to hold a workpiece, there is a risk that the workpiece slips and the hand fails to grip the workpiece.

The present invention has been devised to solve the above problem, it is therefore an object of the present invention to provide a machine tool capable of causing a hand of an automatic transfer machine installed inside an exterior cover to reliably grip a workpiece.

According to the present invention, a machine tool includes: an exterior cover covering a machining area where a workpiece on a worktable is machined by a machining tool; an automatic transfer machine arranged inside the exterior cover and configured to replace the workpiece on the worktable; a control unit configured to control a posture of the automatic transfer machine and a coordinate point at which a hand of the automatic transfer machine is positioned; and a removal unit arranged inside the exterior cover and configured to remove scattered matter that has been generated during machining of the workpiece and has adhered at least to the hand when the automatic transfer machine is set at a predetermined posture or when the hand is moved to a predetermined coordinate point. This configuration enables the hand to grip the workpiece reliably.

Herein, the removal unit may be a fluid-flow generator unit configured to use a fluid to remove the scattered matter adhering at least to the hand. This enables reliable gripping of the workpiece by the hand.

Further, a retraction area into which the automatic transfer machine is retracted during the machining of the workpiece may be provided inside the exterior cover, the control unit may be configured to position at least the hand in the retraction area while the workpiece is being machined, and the fluid-flow generator unit is configured to remove the scattered matter attached to the hand by use of the fluid when the hand moves from the machining area to the retraction area, or when the hand moves from the retraction area to the machining area. Owing thereto, the scattered matter adhering to the hand can be removed before the hand grips the workpiece, so that the workpiece can be reliably gripped by the hand.

The machine tool may further include: in the exterior cover, a hand holder configured to hold the hand that has been detached from the automatic transfer machine; and a fluid-flow generator unit holder configured to hold the fluid-flow generator unit that has been detached from the automatic transfer machine. Further, the control unit may be configured to detach the hand from the automatic transfer machine and cause the hand holder to hold the hand, and also configured to detach the fluid-flow generator unit from the fluid-flow generator unit holder and attach the fluid-flow generator unit to the automatic transfer machine, and the fluid-flow generator unit in the state of being attached to the automatic transfer machine may be configured to remove the scattered matter adhering to the hand by use of the fluid. This configuration makes it possible to remove scattered matter from the hand while the automatic transfer machine is waiting without performing replacement work of workpieces. Therefore, it is possible to shorten the time of replacement work of workpieces.

The removal unit may be an electromagnetic field generator unit configured to remove the scattered matter adhering at least to the hand by use of an electric field or a magnetic field. This configuration enables the hand to grip the workpiece reliably.

Further, a retraction are into which the automatic transfer machine is retracted during the machining of the workpiece may be provided inside the exterior cover, the control unit may be configured to position at least the hand in the retraction area while the workpiece is being machined, and the electromagnetic field generator unit may be configured to remove the scattered matter attached to the hand by use of the electric field or the magnetic field when the hand moves from the machining area to the retraction area, or when the hand moves from the retraction area to the machining area. Thereby, the scattered matter adhered to the hand can be removed before the hand grips the workpiece, so that the workpiece can be reliably gripped by the hand.

Further, the removal unit may be a wiper configured to remove the scattered matter adhering at least to the hand. This configuration makes it possible to remove the scattered matter attached to the hand with a simple structure.

Thus, the present invention enables the hand of the automatic transfer machine provided inside the exterior cover to grip the workpiece reliably.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A machine tool according to the present invention will be detailed hereinbelow by describing preferred embodiments with reference to the accompanying drawings.

First Embodiment

[Overall Structure of Machine Tool]

Figure 1:
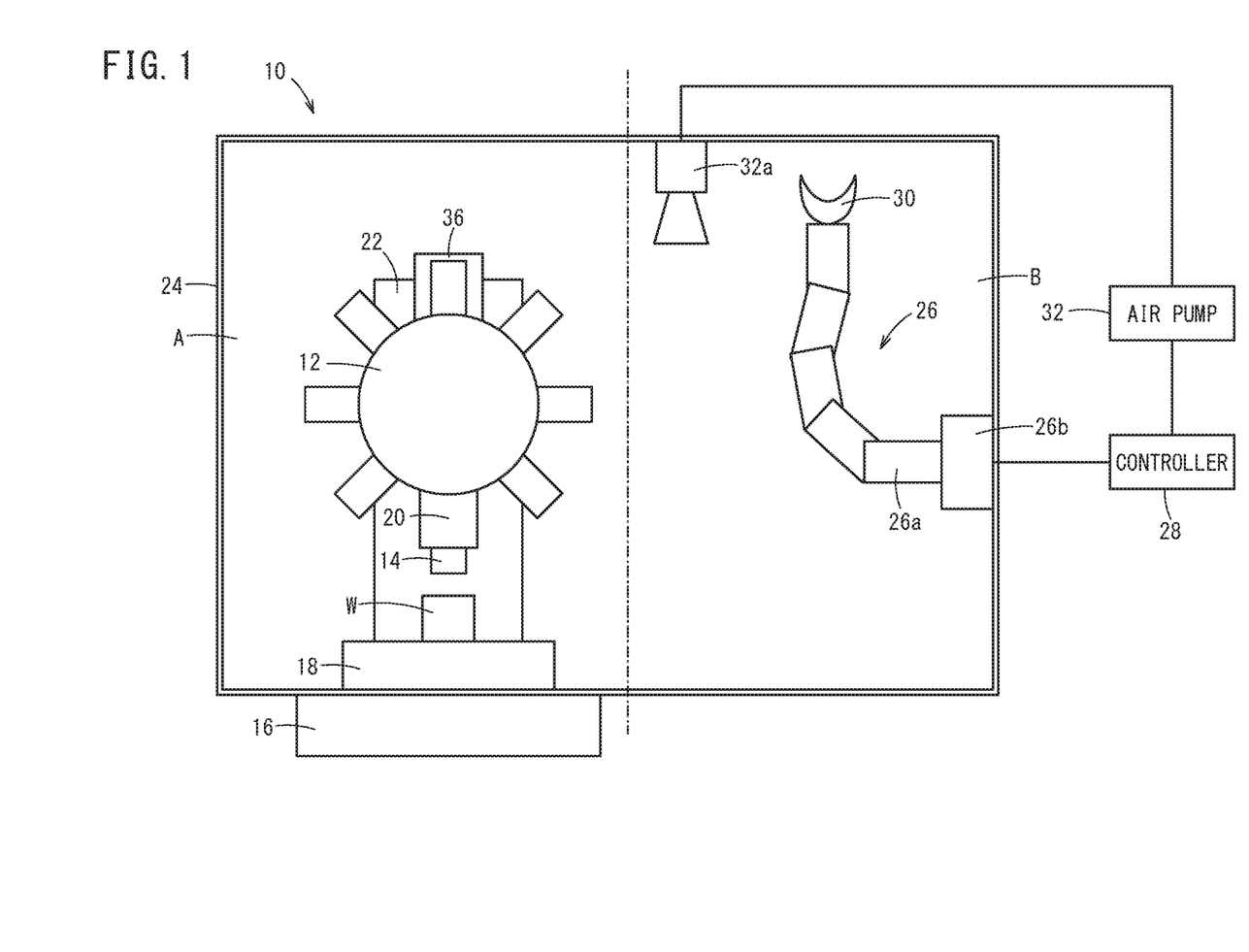
FIG. 1 is a schematic configuration diagram of a machine tool according to a first embodiment.
Figure 2:
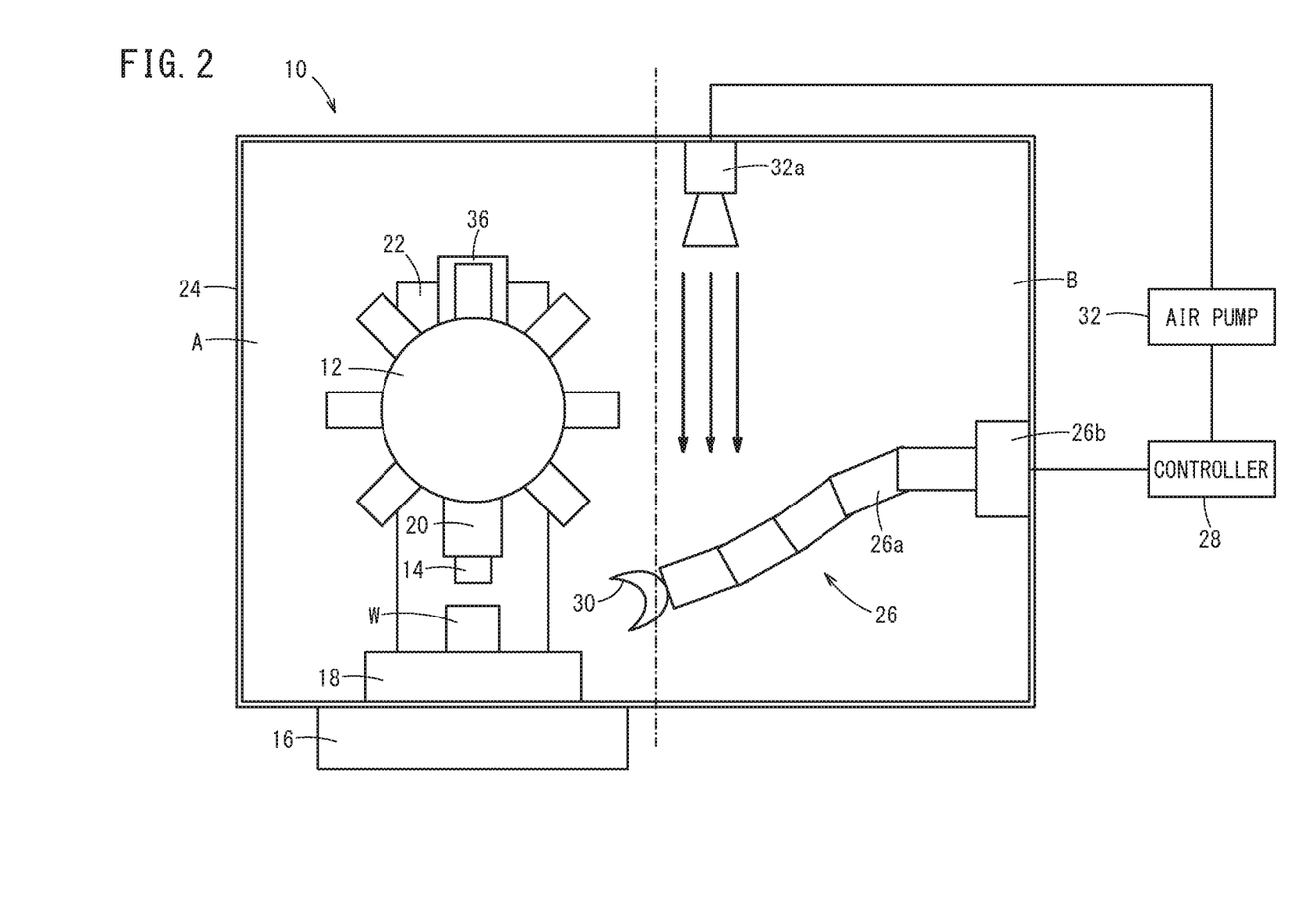
FIG. 2 is a schematic configuration diagram of the machine tool of the first embodiment.

FIGS. 1 and 2 are schematic configuration diagrams of a machine tool 10. FIG. 1 shows a state in which a workpiece W is being machined by the machine tool 10. FIG. 2 shows a state in which the workpiece W is not processed by the machine tool 10. The machine tool 10 of the first embodiment is a machining center having an automatic tool changer 12. In the machine tool 10, a plurality of machining tools 14 are automatically changed by the automatic tool changer 12 so as to perform multiple cutting processes on the workpiece W. The machine tool 10 includes the automatic tool changer 12, a bed 16, a worktable 18, a spindle head 20, a column 22, an exterior cover 24, an articulated robot (automatic transfer machine) 26 and a controller (control unit) 28.

The worktable 18 is set on the upper surface of the bed 16. The worktable 18 is arranged so as to be movable relative to the bed 16 in the horizontal direction, and is moved to a desired position by a ball screw mechanism and a servomotor (not shown). The workpiece W is fixed on the top surface of the worktable 18.

The spindle head 20 as well as the automatic tool changer 12 is supported by the column 22 so as to be movable in the vertical direction. A ball screw mechanism (not shown) is provided at the connecting portion between the spindle head 20 and the column 22. The spindle head 20 and the automatic tool changer 12 integrally move as the servomotor 36 drives the ball screw mechanism.

A machining tool 14 is attached to a spindle (not shown) of the spindle head 20. The machining tool 14 attached to the spindle is automatically changed by the automatic tool changer 12 in accordance with the machining steps. As the spindle rotates, the machining tool 14 cuts the workpiece W. By controlling the horizontal movement of the worktable 18 and the vertical movement of the spindle head 20, the workpiece W can be cut into a desired shape.

The automatic tool changer 12, the worktable 18, the spindle head 20 and the column 22 are covered by an exterior cover 24. The exterior cover 24 is provided to prevent chips, cutting fluid, etc., (hereinafter referred to as "scattered matter") generated by the machining tool 14 that machines the workpiece W, from scattering outside the exterior cover 24. Further, the exterior cover 24 prevents contact between the operator and the rotating bodies such as the machining tool 14, during the machining of the workpiece W.

The articulated robot 26 is arranged in the exterior cover 24. The articulated robot 26 replaces the workpieces W on the worktable 18. The articulated robot 26 has an arm 26a and is fixed to the exterior cover 24 via a base 26b. A hand 30 is attached to the distal end of the arm 26a. The hand 30 can grip the workpiece W, and the articulated robot 26 can move the workpiece W being held by the hand 30 to a desired position. The exterior cover 24 has an unillustrated openable/closable door. The articulated robot 26 takes off the machined workpiece W from the worktable 18 and transfers it through the door of the exterior cover 24 to the outside thereof. The articulated robot 26 brings another unmachined workpiece W through the door of the exterior cover 24 thereinto and set the workpiece W on the worktable 18. Here, the articulated robot 26 may be configured to put the machined workpiece W inside the exterior cover 24 and set an unmachined workpiece W that has been placed inside the exterior cover 24 onto the worktable 18.

The interior of the exterior cover 24 includes a machining area A, which is an area where the workpiece W is machined by the machining tool 14 and a retraction area B, which is an area into which the articulated robot 26 is retracted while the workpiece W is being machined. The retraction area B is provided adjacent to the machining area A. The articulated robot 26 is fixed to the side surface of the exterior cover 24 in the retraction area B. When replacing workpieces W, the articulated robot 26 extends the arm 26a from the retraction area B toward the machining area A and the hand 30 performs operations in the machining area A (see FIG. 2). When the workpiece W is being machined, the articulated robot 26 retracts the arm 26a and the hand 30 to the retraction area B (see FIG. 1).

The controller 28 controls the posture of the arm 26a and the coordinates of the position at which the hand 30 is located. In response to control signals from the controller 28, the arm 26a takes a desired posture and moves the hand 30 to a desired position.

[Configuration of Air Pump]

The machine tool 10 further includes an air pump 32. The air pump 32 is connected to an air nozzle (removal unit, fluid-flow generator unit) 32a via piping. The air nozzle 32a is fixed to the upper surface of the exterior cover 24. The air nozzle 32a is provided inside the retraction area B of the exterior cover 24 closer to the machining area A such that air can be ejected downward. When the arm 26a and the hand 30 move from the retraction area B to the machining area A or when moving from the machining area A to the retraction area B, the controller 28 drives the air pump 32 so as to blow air toward the arm 26a and the hand 30 that are passing under the air nozzle 32a. Thereby, the scattered matter attached to the arm 26a and the hand 30 is removed.

[Operation and Effect]

In the machine tool 10 of the first embodiment, the articulated robot 26 is provided in the exterior cover 24 having the machining area A for machining workpieces W. Provision of the articulated robot 26 in the exterior cover 24 makes it possible to replace the workpiece W on the worktable 18 speedily as compared with the case where the articulated robot 26 is arranged outside the exterior cover 24, and reduce the installation space of the entire machine tool 10 including the articulated robot 26.

However, in the interior of the exterior cover 24, chips, cutting fluid and other matter are scattered during the machining of the workpiece W, so that the scattered matter may adhere to the arm 26a and the hand 30. When the hand 30 with scatters attached thereto attempts to grip the workpiece W, there is a risk that the workpiece W slips and the hand 30 fails to grip the workpiece W reliably. Further, in gripping the workpiece W with the hand 30, there is a risk that the scattered matter attached to the hand 30 may damage the workpiece W. Furthermore, if the arm 26a and/or the hand 30 is left with scattered matter attached thereto, corrosion of the arm 26a and the hand 30 may be accelerated.

Therefore, in the first embodiment, the air nozzle 32a is provided inside the exterior cover 24, and the controller 28 drives the air pump 32 so as to blow air toward the arm 26a and the hand 30 from the air nozzle 32a. As a result, it is possible to remove the scattered matter adhering to the arm 26a and the hand 30. Accordingly, it is possible to reliably grip the workpiece W by the hand 30. Further, this configuration can suppress causing damage to the workpiece W when the hand 30 grips the workpiece W. Furthermore, corrosion of the arm 26a and the hand 30 can be suppressed.

Further, in the first embodiment, when the hand 30 moves from the retraction area B to the machining area A or when moving from the machining area A to the retraction area B, the controller 28 drives the air pump 32 so as to blow air from the air nozzle 32a toward the hand 30. Thereby, the scattered matter attached to the hand 30 can be removed before the hand 30 grips the workpiece W, so that the workpiece W can be reliably gripped by the hand 30. Further, this configuration can suppress causing damage to the workpiece W when the workpiece W is gripped by the hand 30.

Second Embodiment

Figure 3:
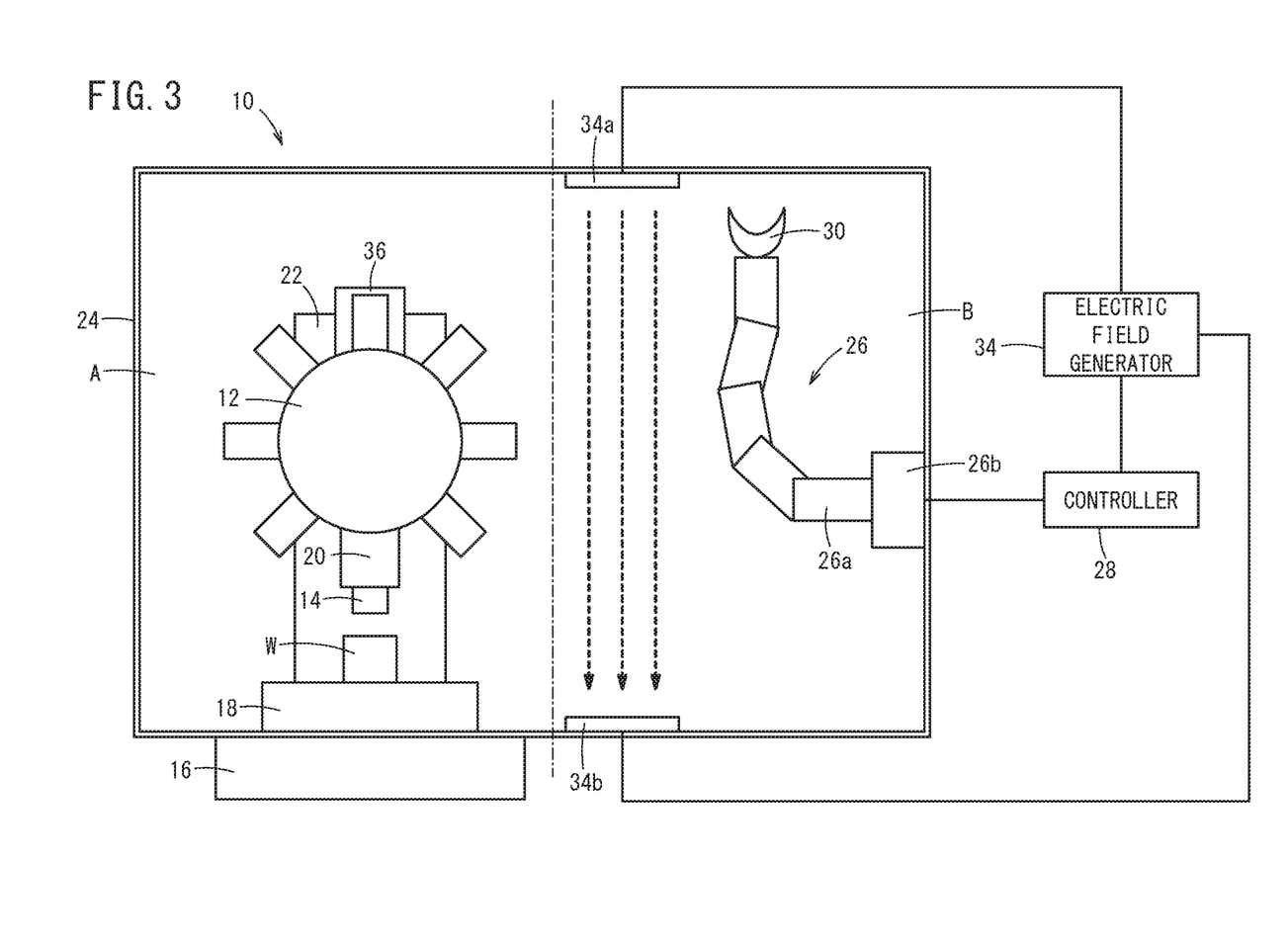
FIG. 3 is a schematic configuration diagram of a machine tool of a second embodiment.

In the second embodiment, an electric field is generated between a positive electrode (removal unit, electromagnetic field generator unit) 34a and a negative electrode (removal unit, electromagnetic field generator unit) 34b of an electric field generator 34 to thereby remove the scattered matter adhering to the arm 26a and the hand 30. Now, the second embodiment will be described hereinbelow, but the same reference numerals will be used for the same components as those in the first embodiment without giving detailed description.

[Configuration of Electric Field Generator]

FIG. 3 is a schematic configuration diagram of the machine tool 10. The electric field generator 34 has a positive electrode 34a and a negative electrode 34b. The electric field generator 34 is constituted of a power source, an inverter and the like, and controlled by the controller 28 to generate a voltage difference between the positive electrode 34a and the negative electrode 34b so as to generate an electric field between the positive electrode 34a and the negative electrode 34b. The positive electrode 34a and the negative electrode 34b are arranged close to the machining area A inside the retraction area B of the exterior cover 24. The positive electrode 34a is fixed to the upper surface of the exterior cover 24, and the negative electrode 34b is fixed to the lower surface of the exterior cover 24. The installation positions of the positive electrode 34a and the negative electrode 34b may be reversed.

When the arm 26a and the hand 30 move from the retraction area B to the machining area A or when moving from the machining area A to the retraction area B, the controller 28 drives the electric field generator 34 to generate an electric field between the positive electrode 34a and the negative electrode 34b. Since cutting chips scattered in machining the workpiece W are charged with electricity, when the arm 26a and the hand 30 move through the electric field generated between the positive electrode 34a and the negative electrode 34b, the chips attached on the arm 26a and the hand 30 are attracted by the positive electrode 34a or the negative electrode 34b.

[Operation and Effect]

In the second embodiment, the positive electrode 34a and the negative electrode 34b are arranged inside the exterior cover 24, and the controller 28 drives the electric field generator 34 to generate an electric field between the positive electrode 34a and the negative electrode 34b. As a result, it is possible to remove the scattered matter adhering to the arm 26a and the hand 30. Therefore, the hand 30 can reliably grip the workpiece W. Further, this configuration can suppress causing damage to the workpiece W when the hand 30 grips the workpiece W. Furthermore, corrosion of the arm 26a and the hand 30 can be suppressed.

In the second embodiment, when the hand 30 moves from the retraction area B to the machining area A or when moving from the machining area A to the retraction area B, an electric field is generated between the positive electrode 34a and the negative electrode 34b of the electric field generator 34. Thereby, the scattered matter attached to the hand 30 can be removed before the hand 30 grips the workpiece W, so that the hand 30 can reliably grip the workpiece W. Further, this configuration can suppress causing damage to the workpiece W when the workpiece W is gripped by the hand 30.

Third Embodiment

Figure 4:
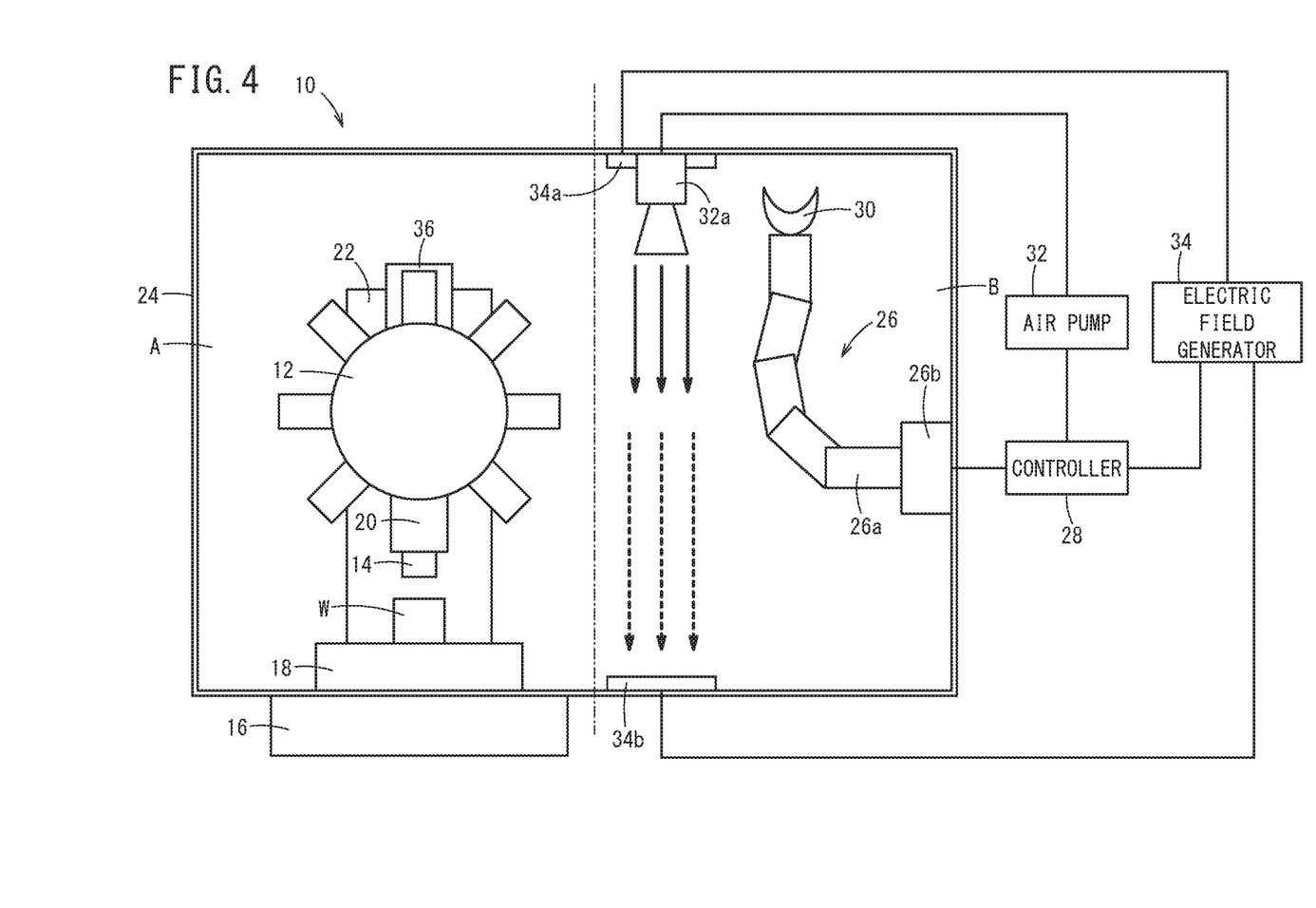
FIG. 4 is a schematic configuration diagram of a machine tool of a third embodiment.

In the third embodiment, air blown from an air nozzle 32a and an electric field generated by an electric field generator 34 are used to remove scattered matter attached to an arm 26a and a hand 30. Now, the third embodiment will be described hereinbelow, but the same reference numerals will be used for the same components as those in the first and second embodiments without giving detailed description.

[Configuration of Air Pump and Electric Field Generator]

FIG. 4 is a schematic configuration diagram of the machine tool 10. The air pump 32 has an air nozzle 32a. The air nozzle 32a is provided inside the exterior cover 24, and air supplied from the air pump 32 is ejected from the air nozzle 32a. The air pump 32 is controlled by the controller 28. The air nozzle 32a is provided in the retraction area B of the exterior cover 24 at a position close to the machining area A. The air nozzle 32a is fixed to the upper surface of the exterior cover 24 to blow air downward.

The electric field generator 34 has the positive electrode 34a and the negative electrode 34b. The electric field generator 34 is constituted of a power source, an inverter and the like and controlled by the controller 28 to generate a voltage difference between the positive electrode 34a and the negative electrode 34b and thereby create an electric field between the positive electrode 34a and the negative electrode 34b. The positive electrode 34a and the negative electrode 34b are arranged inside the retraction area B of the exterior cover 24 at a position closer to the machining area A. The positive electrode 34a is fixed to the upper surface of the exterior cover 24, and the negative electrode 34b is fixed to the lower surface of the exterior cover 24. The installation positions of the positive electrode 34a and the negative electrode 34b may be reversed.

When the arm 26a and the hand 30 move from the retraction area B to the machining area A or when moving from the machining area A to the retraction area B, the controller 28 drives the air pump 32 so as to blow air toward the arm 26a and the hand 30 that are passing under the air nozzle 32a. Further, when the arm 26a and the hand 30 move from the retraction area B to the machining area A or when moving from the machining area A to the retraction area B, the controller 28 drives the electric field generator 34 to generate an electric field between the positive electrode 34a and the negative electrode 34b. Thereby, the scattered matter attached to the arm 26a and the hand 30 is removed.

[Operation and Effect]

In the third embodiment, when the hand 30 moves from the retraction area B to the machining area A or when moving from the machining area A to the retraction area B, the controller 28 drives the air pump 32 so as to blow air from the air nozzle 32a toward the hand 30, at the same time, the controller 28 drives the electric field generator 34 to generate an electric field between the positive electrode 34a and the negative electrode 34b. Thereby, the scattered matter attached to the hand 30 can be removed before the hand 30 grips the workpiece W, so that the hand 30 can reliably grip the workpiece W.

Fourth Embodiment

Figure 5:
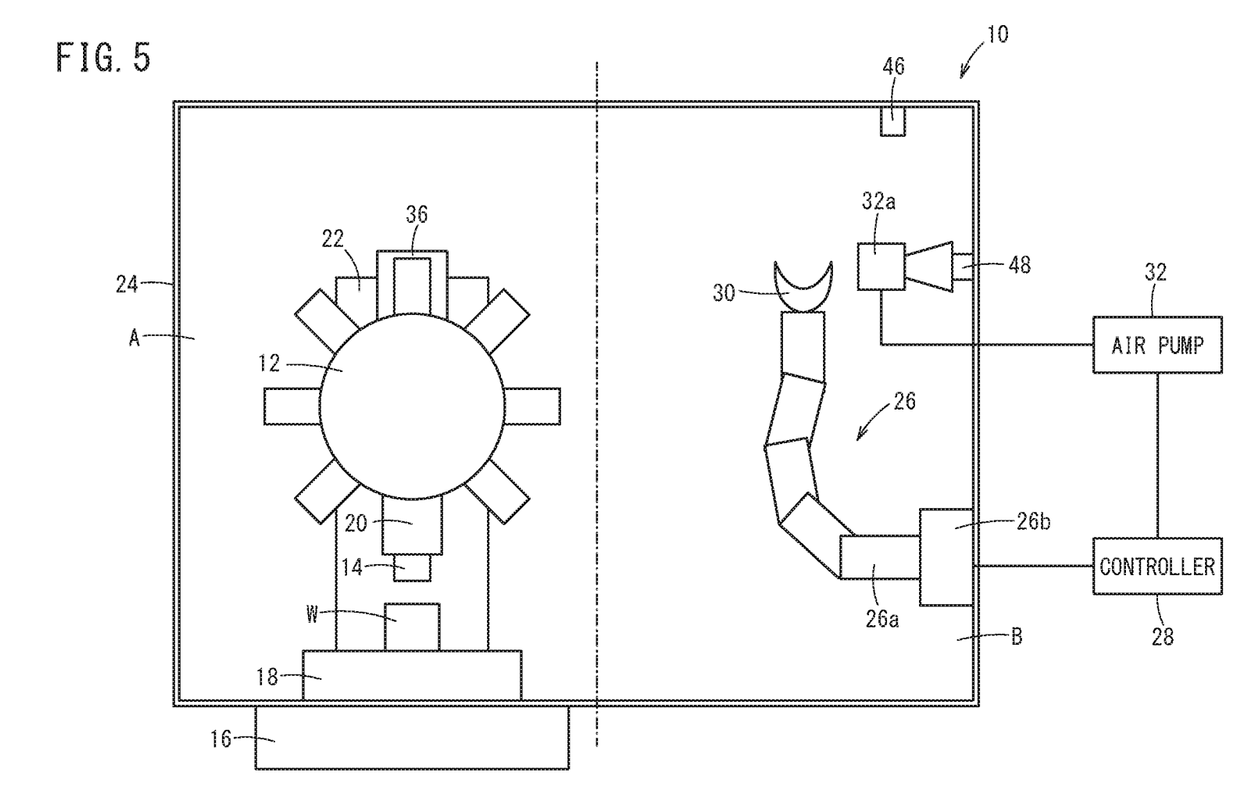
FIG. 5 is a schematic configuration diagram of a machine tool of a fourth embodiment.
Figure 6:
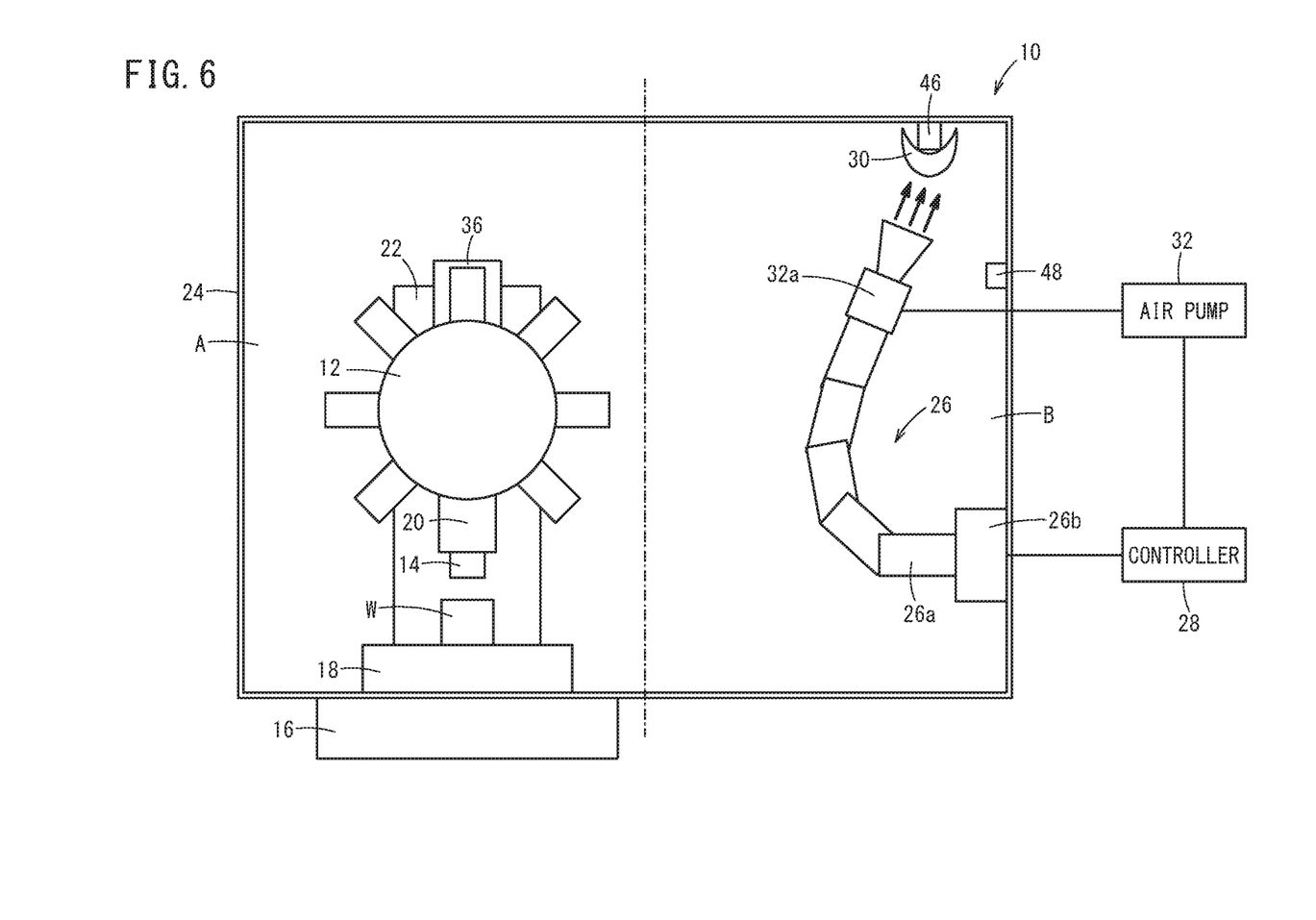
FIG. 6 is a diagram showing a method of removing scattered matter by means of an air nozzle of the fourth embodiment.

The fourth embodiment is constructed such that, when the hand 30 is held by the exterior cover 24, air is ejected from the air nozzle 32a that is attached to the articulated robot 26, so as to remove the scattered matter adhering to the hand 30.

[Configuration of Exterior Cover]

FIG. 5 is a schematic configuration diagram of the machine tool 10. The exterior cover 24 has a hand holder 46 for holding the hand 30, and a nozzle holder 48 for holding the air nozzle 32a. The controller 28 controls the articulated robot 26 to move the hand 30 or the air nozzle 32a attached to the distal end of the arm 26a, to the hand holder 46 or to the nozzle holder 48, such that the hand 30 or the air nozzle 32a is held on the hand holder 46 or the nozzle holder 48. The controller 28 controls the articulated robot 26 to detach the hand 30 from the hand holder 46 or detach the air nozzle 32a from the nozzle holder 48 and attach the hand 30 or the air nozzle 32a to the distal end of the arm 26a.

FIG. 6 is a diagram showing a method of removing scattered matter by the air nozzle 32a. First, the controller 28 controls the articulated robot 26 such that the hand 30 is detached from the arm 26a and then held on the hand holder 46. Next, the controller 28 controls the articulated robot 26 so as to detach the air nozzle 32a from the nozzle holder 48 and then attach the air nozzle 32a to the distal end of the arm 26a. Next, the controller 28 causes the articulated robot 26 to move the air nozzle 32a close to the hand 30 and blow off scattered matter attached to the hand 30, by air blown from the air nozzle 32a. In the fourth embodiment, removal of the scattered matter adhering to the hand 30 by the air blown from the air nozzle 32a is performed after completion of the machining of the workpiece W and before replacement of the workpiece W on the worktable 18. However, when to remove scattered matter is not particularly limited.

[Operation and Effect]

In the fourth embodiment, the controller 28 controls the articulated robot 26 such that the hand 30 attached to the arm 26a is held on the hand holder 46, and the air nozzle 32a is attached to the arm 26a. Then, as the air nozzle 32a blows air, the scattered matter adhered to the hand 30 is removed. In this way, it is possible to remove scattered matter from the hand 30 while the articulated robot 26 is waiting without performing replacement work of workpieces W. Therefore, it is possible to shorten the time of replacement work of workpieces W.

Fifth Embodiment

Figure 7:
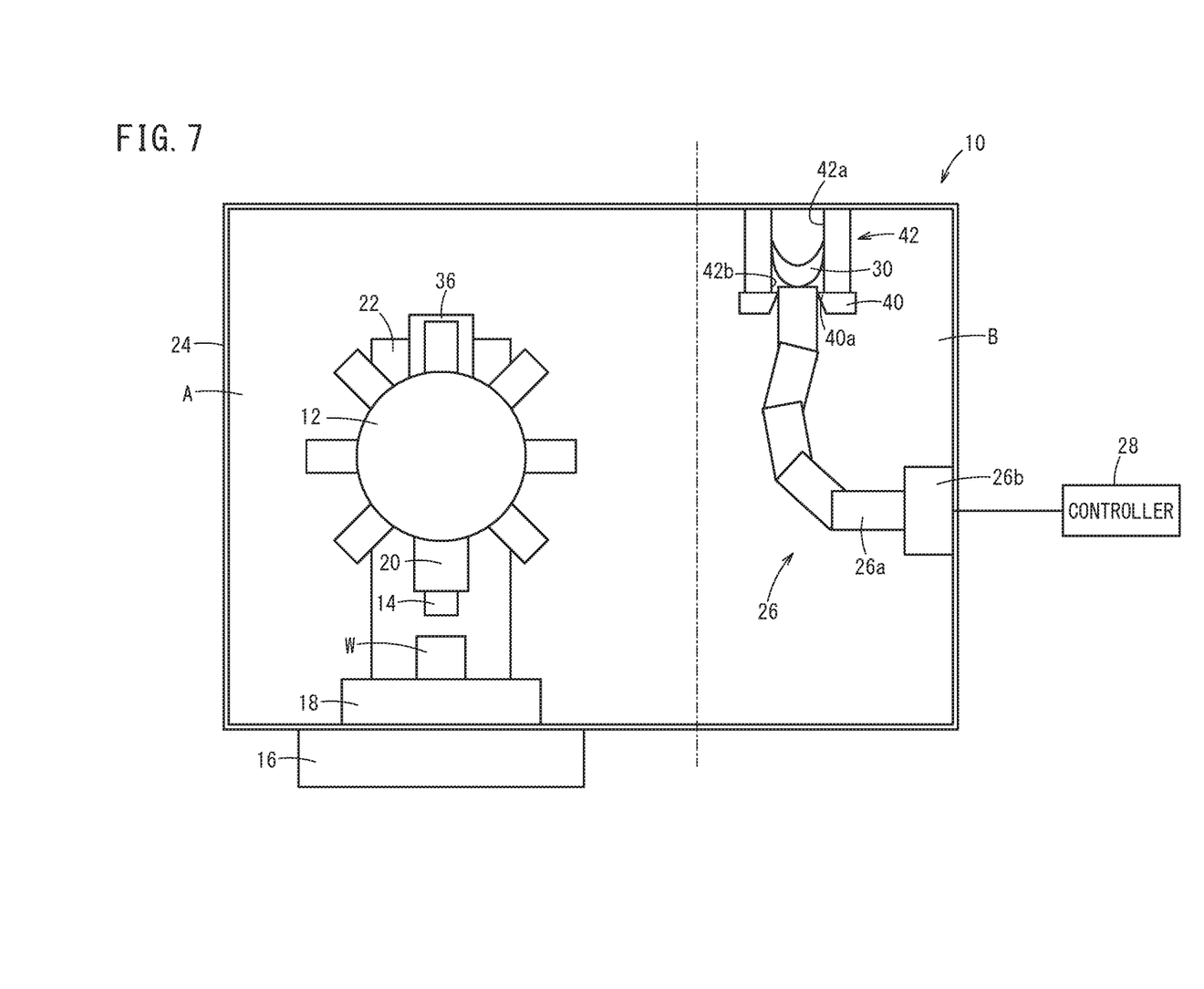
FIG. 7 is a schematic configuration diagram of a machine tool of a fifth embodiment.

In the fifth embodiment, a protective cover 42 for protecting a hand 30 from scattered matter is provided, and a wiper (removal unit) 40 is provided on the protective cover 42. The wiper 40 removes the scattered matter attached to the arm 26a and the hand 30. Now, the fifth embodiment will be described hereinbelow, but the same reference numerals will be used for the same components as those in the first through fourth embodiments without giving detailed description.

[Configuration of Protective Cover]

FIG. 7 is a schematic configuration diagram of the machine tool 10. The protective cover 42 is fixed to the upper surface of the exterior cover 24 in the retraction area B inside the exterior cover 24. The protective cover 42 has a storing portion 42a having a hollow space therein, and an opening 42b which establishes communication between the storing portion 42a and the outside. The storing portion 42a is formed so as to be able to accommodate the hand 30 inserted from the opening 42b. The storing portion 42a should, at least, accommodate the hand 30, and also may accommodate part of the arm 26a.

During the machining of the workpiece W, the controller 28 controls the articulated robot 26 so as to insert the hand 30 into the storing portion 42a of the protective cover 42. At this time, the hand 30 is enveloped with the protective cover 42. Thereby, scattered matter arising during the machining of the workpiece W is prevented from adhering to the hand 30.

[Configuration of Wiper]

The wiper 40 is provided at the opening 42b of the protective cover 42. The wiper 40 contacts the arm 26a and the hand 30, thereby removing the scattered matter attached to the arm 26a and the hand 30. The shape and material of the wiper 40 are not particularly limited as long as the wiper 40 can remove scattered matter. For example, the wiper 40 is made of resin such as rubber. The wiper 40 has a contact portion 40a, which comes in contact with the arm 26a and the hand 30. The contact portion 40a is formed in a flat shape so as to be in close contact with the arm 26a and the hand 30 when the contact portion 40a comes into contact with the arm 26a or the hand 30. Alternatively, the contact portion 40a may be given in the form of a brush.

Figure 8:
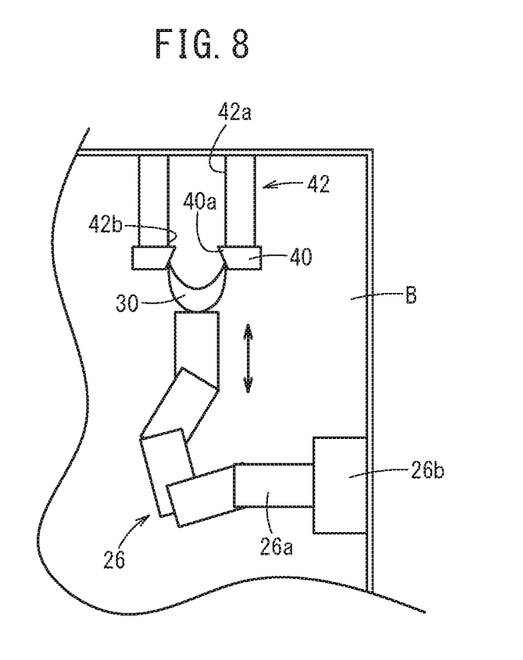
FIG. 8 is a diagram showing an example of a method of removing scattered matter by means of a wiper of the fifth embodiment.
Figure 9:
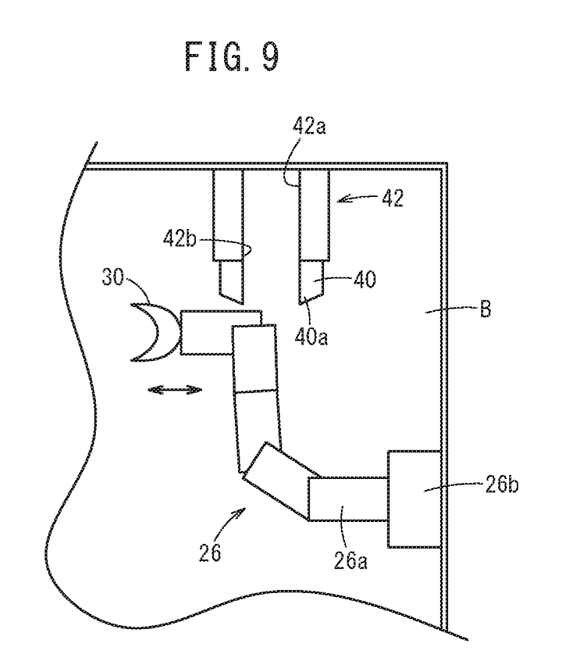
FIG. 9 is a diagram showing an example of a method of removing scattered matter by means of a wiper of the fifth embodiment.

FIGS. 8 and 9 are diagrams showing examples of methods of removing scattered matter by the wiper 40. For example, as shown in FIG. 8, the contact portion 40a of the wiper 40 is provided so as to be directed toward the inner periphery of the opening 42b of the protective cover 42, i.e., face inward. In this case, when the articulated robot 26 brings the hand 30 into and out of the storing portion 42a of the protective cover 42 under the control of the controller 28, the distal ends of the hand 30 and the arm 26a come into contact with the wiper 40 so that scattered matter can be removed. Alternatively, as shown in FIG. 9, the contact portion 40a of the wiper 40 may be provided facing downward. In this case, in a state of abutting the arm 26a and the hand 30 from below against the wiper 40, the controller 28 moves the arm 26a and the hand 30 in a direction approximately orthogonal to a direction in which the contact portion 40a of the wiper 40 extends. As a result, the scattered matter adhering to the arm 26a and the hand 30 is removed.

[Operation and Effect]

In the fifth embodiment, the wiper 40 removes the scattered matter attached to the arm 26a and the hand 30. Thus, it is possible to remove the scattered matter attached to the arm 26a and the hand 30 with a simple configuration.

In the fifth embodiment, the wiper 40 is provided on the protective cover 42 for protecting the hand 30 from scattered matter. As a result, when the hand 30 is put in and taken out from the protective cover 42, the wiper 40 can touch the hand 30 to thereby remove the scattered matter from the hand 30.

Sixth Embodiment

Figure 10:
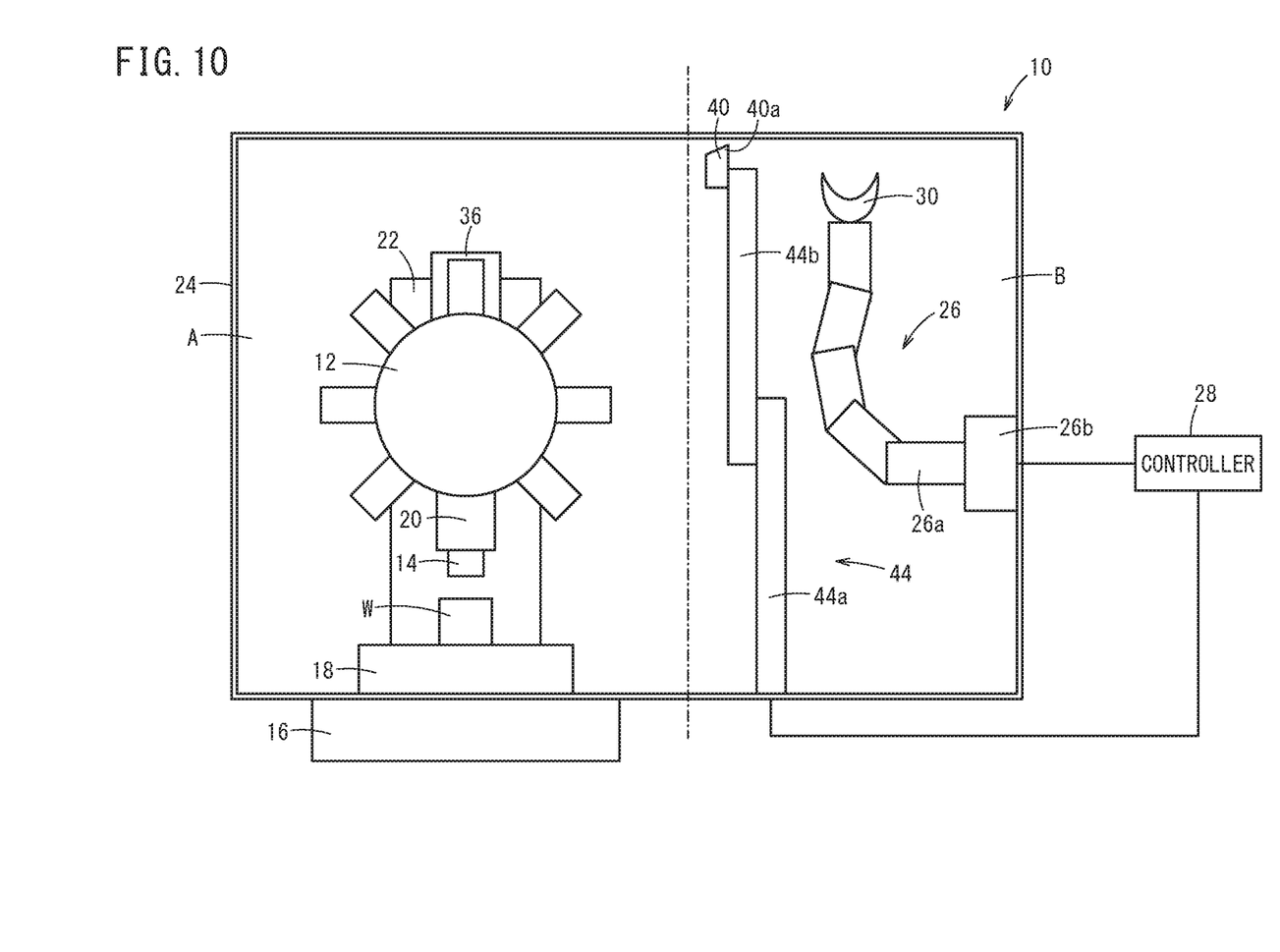
FIG. 10 is a schematic configuration diagram of a machine tool of a sixth embodiment.
Figure 11:
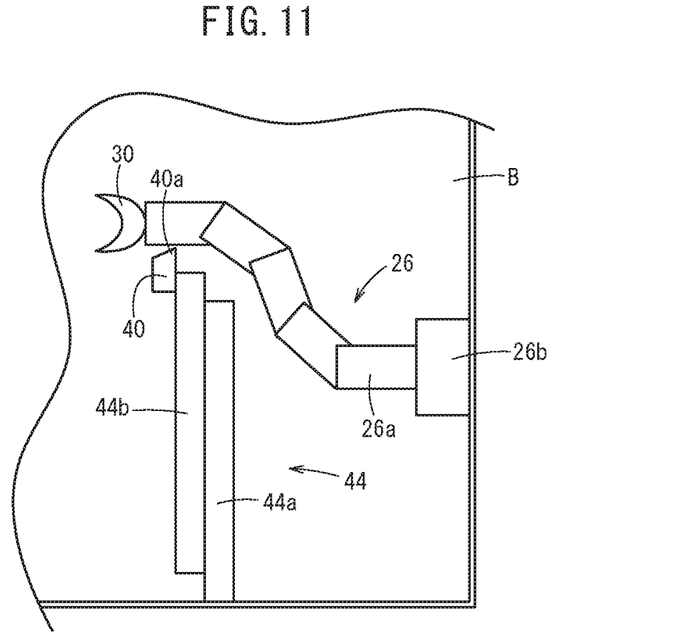
FIG. 11 is a diagram showing one example of a method of removing scattered matter by means of a wiper of the sixth embodiment.

In the sixth embodiment, a wiper 40 is provided for a movable wall 44 that shuts off a machining area A and a retraction area B from each other. Now, the sixth embodiment will be described hereinbelow, but the same reference numerals will be used for the same components as those in the first through fifth embodiments without giving detailed description.

[Configuration of Movable Wall]

FIG. 10 is a schematic configuration diagram of the machine tool 10. FIG. 10 shows a state where the workpiece W is being machined by the machine tool 10.

The movable wall 44 is installed inside the retraction area B of the exterior cover 24 and close to the machining area A. The movable wall 44 includes a fixed portion 44a and a movable portion 44b. The fixed portion 44a is fixed to a lower surface of the exterior cover 24 and formed so as to be as high as about half the height of the exterior cover 24. The movable portion 44b is driven by an unillustrated servomotor or the like to be movable in the vertical direction relative to the fixed portion 44a. The vertical movement of the movable portion 44b is controlled by the controller 28.

While the workpiece W is being machined, the controller 28 controls the articulated robot 26 to retract the arm 26a into the retraction area B, and moves the movable portion 44b upward. At this time, the movable wall 44 shuts off the boundary between the retraction area B between the machining area A to thereby protect the arm 26a and the hand 30 from scattered matter. When replacing workpieces W, the controller 28 moves the movable portion 44b downward to open the boundary between the machining area A and the retraction area B and controls the articulated robot 26 such that the arm 26a extends from the retraction area B to the machining area A, and the hand 30 performs work in the machining area A.

[Configuration of Wiper]

A wiper 40 is provided at the upper end of the movable portion 44b. As with the wiper 40 of the fifth embodiment, the wiper 40 is formed of resin or the like, and makes contact with the arm 26a and the hand 30, thereby removing the scattered matter attached to the arm 26a and the hand 30.

FIG. 11 is a view showing one example of a method of removing scattered matter by the wiper 40. As shown in FIG. 11, a contact portion 40a of the wiper 40 is provided upward from the movable portion 44b of the movable wall 44. The controller 28 moves the movable portion 44b downward, and moves the hand 30 and the arm 26a laterally or in a direction substantially orthogonal to a direction in which the contact portion 40a extends while abutting the arm 26a and the hand 30 from above against the wiper 40. As a result, the scattered matter attached to the arm 26a and the hand 30 is removed. Removal of the scattered matter by the wiper 40 may be performed not only when the movable portion 44b is at the down position but also when the movable portion 44b is moving upward or downward. In this case, control should be performed such that the arm 26a moves upward or downward in accordance with the movement of the movable portion 44b while moving the arm 26a and the hand 30 laterally with respect to the wiper 40.

Other Embodiments

Although the present invention has been described based on the first to the sixth embodiments, the specific configuration of the invention should not be limited to the first to sixth embodiments. Design changes and others that do not depart from the gist of the invention should also be included in the invention.

In the first, third and fourth embodiments, the air nozzle 32a is configured to blow air, but air may be suctioned. The air nozzle 32a may eject, for example, inert nitrogen or the like, instead of air. The air nozzle 32a may eject a liquid, instead of gas such as air. That is, any type of fluid may be used as long as it does not accelerate corrosion of the machine tool 10 and does not attach to the hand 30 to thereby affect its gripping of the workpiece W.

Although an electric field is generated by the electric field generator 34 of the second and third embodiments, a magnetic field may be generated instead. Since the chips scattered upon the machining of the workpiece W are magnetized, they can be attracted by the magnetic field.

In the first to third embodiments and the sixth embodiment, the air nozzle 32a, the positive and negative electrodes 34a and 34b or the movable wall 44, is arranged in the retraction area B of the exterior cover 24 at a position close to the machining area A. However, the air nozzle 32a, the positive and negative electrodes 34a and 34b or the movable wall 44 may be arranged in the machining area A of the exterior cover 24 at a position close to the retraction area B.

What is claimed is:

1. A machine tool comprising:
an exterior cover covering a machining area where a workpiece on a worktable is machined by a machining tool;
an automatic transfer machine arranged inside the exterior cover and configured to replace the workpiece on the worktable;
a control unit configured to control a posture of the automatic transfer machine and a coordinate point at which a hand of the automatic transfer machine is positioned; and
a removal unit arranged inside the exterior cover and configured to remove scattered matter that has been generated during machining of the workpiece and has adhered at least to the hand when the automatic transfer machine is set at a predetermined posture or when the hand is moved to a predetermined coordinate point,
wherein
the removal unit is a fluid-flow generator unit configured to use a fluid to remove the scattered matter adhering at least to the hand,
the machine tool further comprises, in the exterior cover,
a hand holder configured to hold the hand that has been detached from the automatic transfer machine; and
a fluid-flow generator unit holder configured to hold the fluid-flow generator unit that has been detached from the automatic transfer machine,
wherein the control unit is configured to detach the hand from the automatic transfer machine and cause the hand holder to hold the hand, and also configured to detach the fluid-flow generator unit from the fluid-flow generator unit holder and attach the fluid-flow generator unit to the automatic transfer machine; and the fluid-flow generator unit in a state of being attached to the automatic transfer machine is configured to remove the scattered matter adhering to the hand by use of the fluid.

* * * * *